US012036790B2

(12) United States Patent
Han

(10) Patent No.: US 12,036,790 B2
(45) Date of Patent: Jul. 16, 2024

(54) INSPECTION APPARATUS

(71) Applicant: Samsung Display Co., Ltd., Yongin-Si (KR)

(72) Inventor: Jeongwon Han, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 129 days.

(21) Appl. No.: 17/517,615

(22) Filed: Nov. 2, 2021

(65) Prior Publication Data

US 2022/0161549 A1 May 26, 2022

(30) Foreign Application Priority Data

Nov. 26, 2020 (KR) ........................ 10-2020-0160850

(51) Int. Cl.
*B41J 2/045* (2006.01)
*B41J 2/125* (2006.01)
*B41J 2/165* (2006.01)

(52) U.S. Cl.
CPC ............ *B41J 2/0451* (2013.01); *B41J 2/125* (2013.01); *B41J 2/16579* (2013.01)

(58) Field of Classification Search
CPC ................. B41J 2/16579; B41J 29/393; B41J 11/00212; B41J 2/0451; B41J 2/125; B41J 29/38; B41J 2/2142; G01N 21/94; G01J 1/4257
See application file for complete search history.

(56) References Cited

U.S. PATENT DOCUMENTS

2006/0098040 A1* 5/2006 Kang .................. B41J 2/16538 347/33
2009/0058921 A1* 3/2009 Habashi .............. B41J 2/16579 347/29
2009/0244163 A1* 10/2009 Govyadinov .......... B41J 29/393 347/19

FOREIGN PATENT DOCUMENTS

| | | | |
|---|---|---|---|
| JP | 3291995 | A | 3/1997 |
| KR | 10-0468859 | B1 | 1/2005 |
| KR | 10-0975647 | B1 | 8/2010 |
| KR | 10-2018-0097425 | A | 8/2018 |
| KR | 10-2019-0138705 | A | 12/2019 |

* cited by examiner

*Primary Examiner* — Jannelle M Lebron
(74) *Attorney, Agent, or Firm* — Innovation Counsel LLP

(57) ABSTRACT

An inspection apparatus is disclosed. The inspection apparatus includes a laser, an optical sensor, and a controller. In operation, the laser outputs at least one laser beam, the optical sensor measures an intensity of the at least one laser beam passing through a lower region adjacent to the inkjet head, and the controller controls an ink ejection from the inkjet head based on the intensity of the at least one laser beam.

17 Claims, 13 Drawing Sheets

INSPECTION APPARATUS

This application claims priority to Korean Patent Application No. 10-2020-0160850, filed on Nov. 26, 2020, and all the benefits accruing therefrom under 35 U.S.C. § 119, the content of which in its entirety is herein incorporated by reference.

BACKGROUND

1. Field

The present disclosure relates to an inspection apparatus. More particularly, the present disclosure relates to an inspection apparatus for inspecting an inkjet head.

2. Discussion of the Background

Various processes are used to manufacture a display device such as a liquid crystal display device, an organic light emitting display device, and a quantum nano display device. Among the above processes, an inkjet printing process is used to deposit a pattern on a substrate using an inkjet head. The inkjet head includes a plurality of nozzles and ejects ink onto the substrate through the nozzles. However, when a foreign material exists under the inkjet head or within a nozzle of the inkjet head, the pattern may not be deposited accurately due to the foreign material. For example, a position of the some of the ink might not be deposited accurately or some of the ink may not be ejected.

More generally, the inkjet printing process is used to deposit patterned layers on substrates to produce thin film devices or devices that include thin film components.

SUMMARY

An inspection apparatus according to an embodiment may include a laser, an optical sensor, and a controller. In operation, the laser may output at least one laser beam, the optical sensor measures an intensity of the at least one laser beam passing through a lower region adjacent to an inkjet head that includes nozzles, and the controller controls an ink ejection from the inkjet head based on the intensity of the at least one laser beam.

According to an embodiment, the at least one laser beam may be divided into a first laser beams passing through lower regions adjacent to the nozzles and a second laser beams passing through lower regions of spaces defined between the nozzles. The laser beam may include the first laser beams and the second laser beams.

According to an embodiment, the inspection apparatus may further include a first optical module positioned between the laser and the inkjet head, wherein the first optical module divides the output laser beam into the first laser beams and the second laser beams, a second optical module positioned between the first optical module and the inkjet head, wherein the second optical module adjusts intervals between the first laser beams and the second laser beams, and a third optical module positioned between the second optical module and the inkjet head, wherein the third optical module guides paths of the first laser beams so that the first laser beams are parallel to each other, and guides paths of the second laser beams so that the second laser beams are parallel to each other.

According to an embodiment, the first laser beams may pass through the lower regions adjacent to the nozzles to be parallel to a lower surface of the inkjet head, and the second laser beams may pass through the lower regions of the spaces to be parallel to the lower surface of the inkjet head.

According to an embodiment, the inspection apparatus may further include a first optical path conversion module positioned between the laser and the inkjet head, wherein the first optical path conversion module guides paths of the first laser beams so that the first laser beams pass through the lower region adjacent to the inkjet head and a second optical path conversion module positioned between the inkjet head and the optical sensor, wherein the second optical path conversion module guides paths of the first laser beams so that the first laser beams are incident to the optical sensor.

According to an embodiment, the first optical path conversion module and the second optical path conversion module may include at least one mirror.

According to an embodiment, the optical sensor may measure first intensities of the first laser beams. The controller may determine a third intensity smaller than a first reference intensity among the first intensities, and may stop the ink ejection of the nozzle corresponding to a third laser beam having the third intensity.

According to an embodiment, the optical sensor may measure second intensities of the second laser beams. The controller may determine a fourth intensity smaller than a second reference intensity among the second intensities, and may stop the ink ejection of nozzles adjacent to the spaces corresponding to a fourth laser beam having the fourth intensity.

According to an embodiment, the output laser beam may be divided into first laser beams having a constant distance from each other, and the laser beam may include the first laser beams.

According to an embodiment, the inspection apparatus may further include a first optical module positioned between the laser and the inkjet head, wherein the first optical module divides the output laser beam into the first laser beams, a second optical module positioned between the first optical module and the inkjet head, wherein the second optical module adjusts intervals between the first laser beams, a third optical module positioned between the second optical module and the inkjet head, the third optical module guides paths of the first laser beams so that the first laser beams are parallel to each other, and a fourth optical module positioned between the third optical module and the inkjet head, wherein the fourth optical module guides the first laser beams to a first scan path or a second scan path.

According to an embodiment, the first laser beams guided in the first scan path may pass through lower regions adjacent to the nozzles to be parallel to a lower surface of the inkjet head.

According to an embodiment, the second laser beams guided in the second scan path may pass through lower regions of spaces defined between the nozzles to be parallel to a lower surface of the inkjet head.

According to an embodiment, the optical sensor may measure first intensities of the first laser beams guided in the first scan path. The controller may determine a third intensity smaller than a first reference intensity among the first intensities, and may stop the ink ejection of the nozzle corresponding to a third laser beam having the third intensity.

According to an embodiment, the optical sensor may measure second intensities of the first laser beams guided in the second scan path. The controller may determine a fourth intensity smaller than a second reference intensity among the second intensities, and may stop the ink ejection of nozzles adjacent to the spaces corresponding to a fourth laser beam having the fourth intensity.

According to an embodiment, output laser beam may be converted into a single line laser beam passing through the lower regions adjacent to the nozzles.

According to an embodiment, the optical sensor may measure first intensities of the line laser beam. The controller may determine a second intensity smaller than a reference intensity among the first intensities, and may stop the ink ejection of the nozzle overlapping to the line laser beam having the second intensity.

According to an embodiment, a foreign material exists in the lower region adjacent to the inkjet head, the foreign material reflects or absorbs at least a portion of the laser beam, and the optical sensor detects a decrease of the intensity of the laser beam.

An inspection apparatus according to another embodiment may include a laser, an optical sensor, and a controller. In operation, the laser may output at least one laser beam, the optical sensor may measure an intensity of the at least one laser beam passing through a lower region adjacent to an inkjet head, and the controller may stop a measurement operation of a measuring device in response to the intensity of the at least one laser beam falling below a reference intensity According to an embodiment, the measuring device may pass through the lower region adjacent to the inkjet head after the laser beam passes through the lower region adjacent to the inkjet head.

According to an embodiment, the measuring device may not pass through the lower region adjacent to the inkjet head upon the intensity of the laser beam falling below the reference intensity.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Illustrative, non-limiting embodiments will be more clearly understood from the following detailed description in conjunction with the accompanying drawings.

Figure 1:
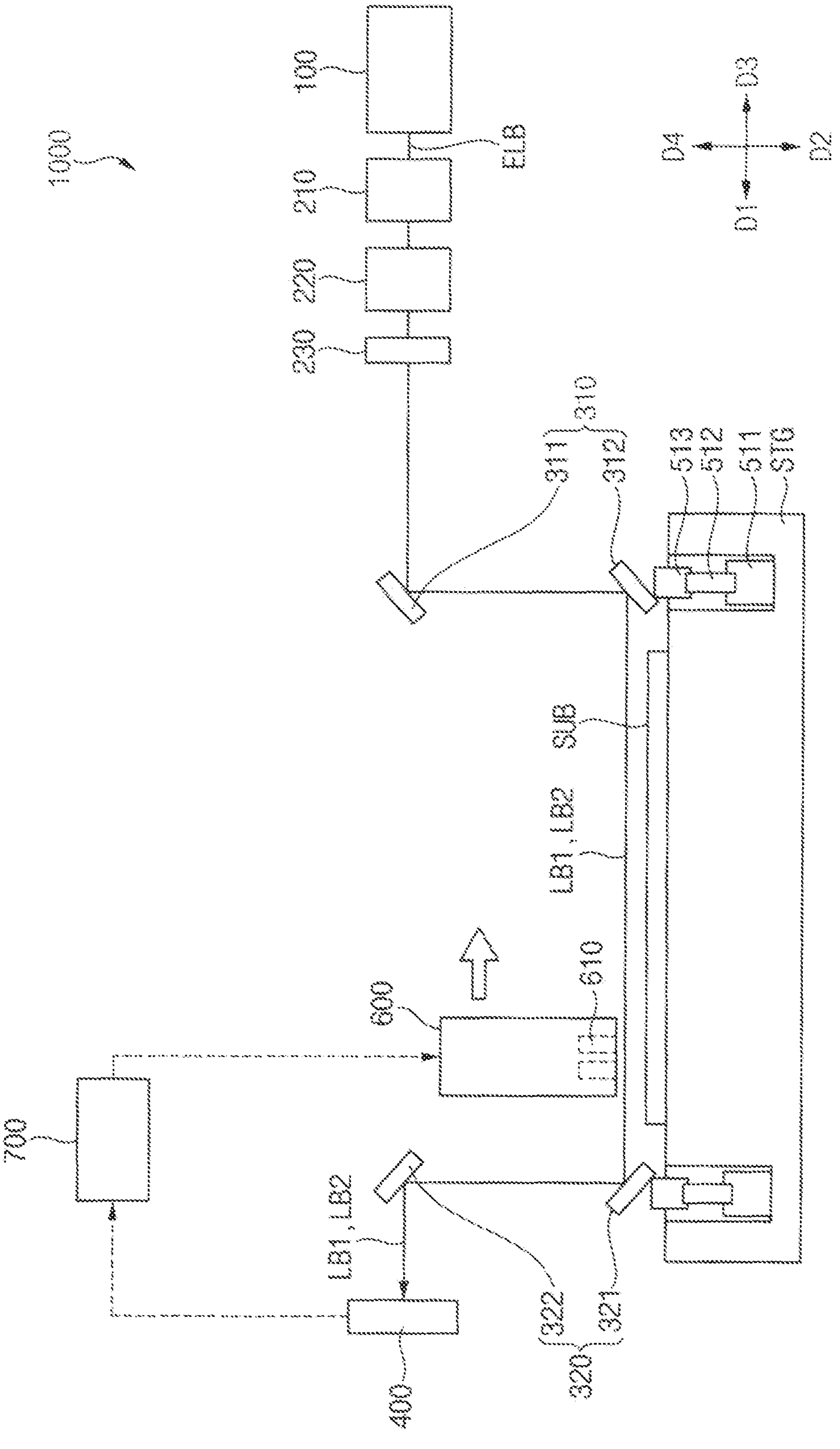
FIG. 1 is a side view illustrating an inspection apparatus according to an embodiment.
Figure 2:
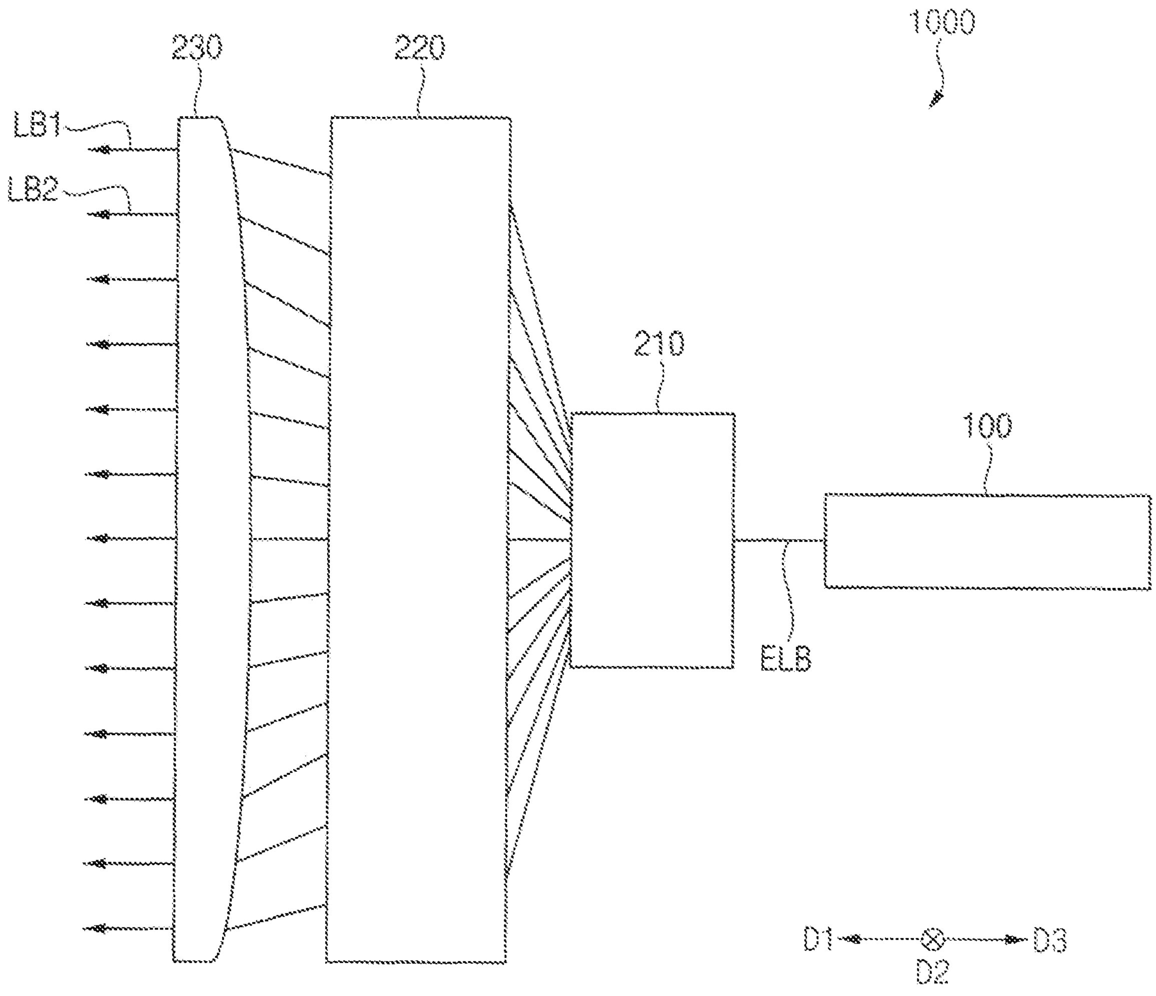
FIG. 2 is a plan view illustrating a laser, a first optical module, a second optical module, and a third optical module included in the inspection apparatus of FIG. 1.
Figure 3:
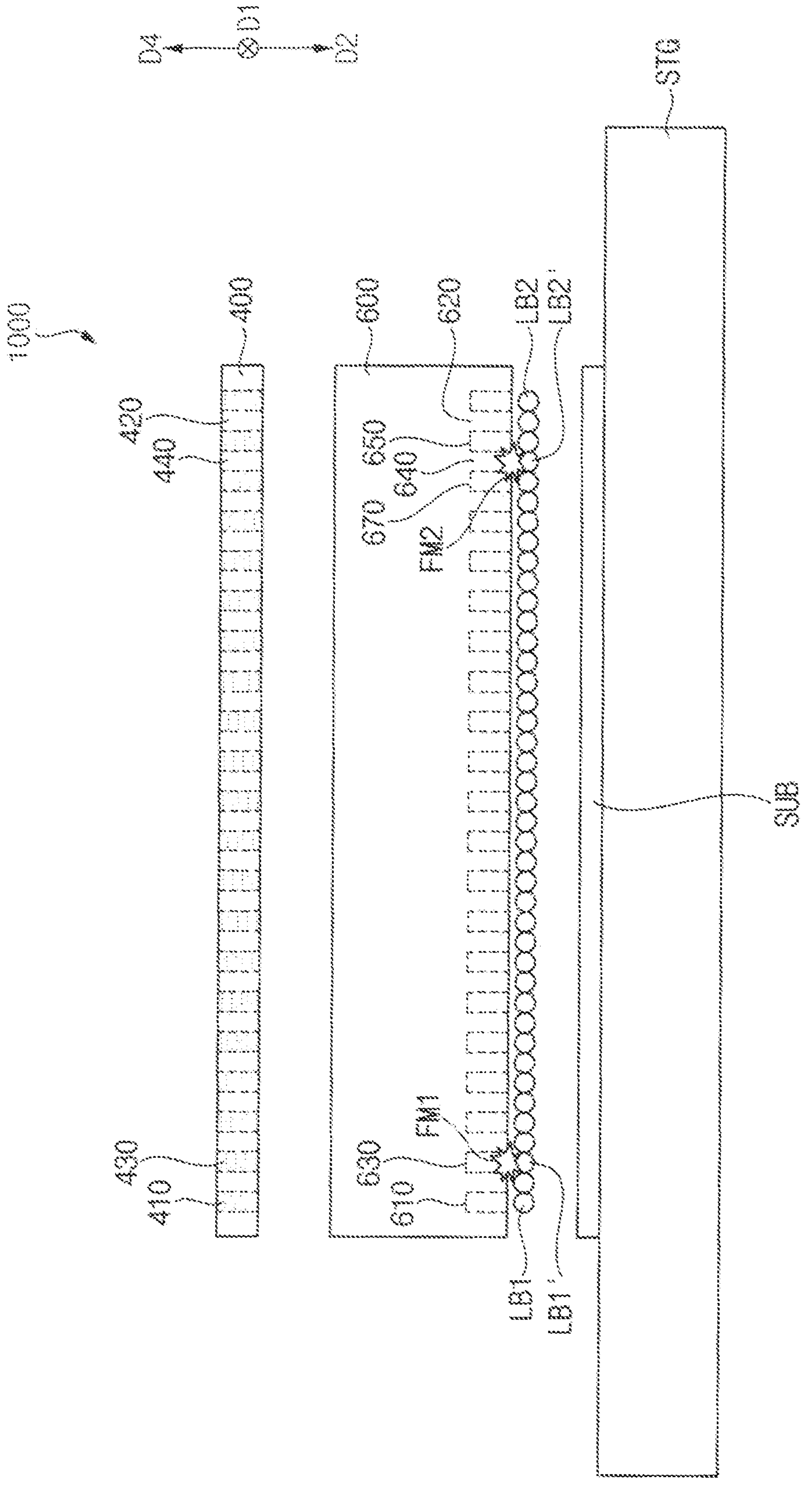
FIG. 3 is a front view illustrating an optical sensor array included in the inspection apparatus of FIG. 1.

FIG. 1 is a side view illustrating an inspection apparatus according to an embodiment. FIG. 2 is a plan view illustrating a laser, a first optical module, a second optical module, and a third optical module included in the inspection apparatus of FIG. 1. FIG. 3 is a front view illustrating an optical sensor array included in the inspection apparatus of FIG. 1.

Referring to FIG. 1, an inspection apparatus 1000 according to an embodiment of the present invention may include a laser 100, a first optical module 210, a second optical module 220, a third optical module 230, and a first optical path conversion module 310, a second optical path conversion module 320, an optical sensor array 400, and a controller 700.

An inkjet head 600 may include a plurality of nozzles. When ink is ejected from the inkjet head 600, which may be referred to as ink ejection, the inkjet head 600 may be moved in a third direction D3 and the nozzles may eject ink to deposit a patterned layer on a substrate SUB.

While the ink ejection is being performed, an inspection operation of the inspection apparatus 1000 may be performed. When the inspection operation of the inspection apparatus 1000 is performed, a first laser beams LB1 and a second laser beams LB2 may pass through a lower region adjacent to the inkjet head 600 to be parallel to a lower surface of the inkjet head 600. When a foreign material exists under the inkjet head 600, first intensities of the first laser beams LB1 or second intensities of the second laser beams LB2 may be decreased. The inspection apparatus 1000 may inspect the presence or absence of the foreign material in real time based on the first intensities and the second intensities.

Referring to FIG. 2, the laser 100 may generate at least one output laser beam ELB. The laser may be a solid-state laser (e.g., a ruby laser, a glass laser, a YAG laser (yttrium aluminum gamet laser), a YLF laser (yttrium lithium fluoride laser, etc.), a gas laser (e.g., an excimer laser, a helium-neon laser), etc.), a pulsed laser, or the like.

In an embodiment, the laser 100 may generate a single output laser beam ELB. In another embodiment, the laser 100 may generate a plurality of output laser beams. Hereinafter, the laser 100 for generating the single output laser beam ELB will be described, but the present invention is not limited thereto.

The first optical module 210 may be positioned between the laser 100 and the second optical module 220. In an embodiment, the first optical module 210 may divide the output laser beam ELB into the first laser beams LB1 and the second laser beam LB2. In addition, the first laser beam LB1 and the second laser beams LB2 may pass through the first optical module 210 at different angles. For example, the first optical module 210 may be a multi-beam generation module including a diffractive optical element or a refractive optical element.

The second optical module 220 may be positioned between the first optical module 210 and the third optical module 230. In an embodiment, the second optical module 220 may adjust intervals between the first laser beams LB1 and intervals between the second laser beams LB2. For example, the second optical module 220 may be an optical zoom module including a plurality of lenses. The second optical module 220 may guide paths of the first laser beams LB1 and paths of the second laser beams LB2 using the lenses.

The third optical module 230 may be positioned between the second optical module 220 and the inkjet head 600 (FIG. 1). In an embodiment, the third optical module 230 may guide paths of the first laser beams LB1 so that the first laser beams LB1 are parallel to each other. In addition, the third optical module 230 may guide paths of the second laser beams LB2 so that the second laser beams LB2 are parallel to each other. For example, the third optical module 230 may be an f-theta lens.

Referring back to FIG. 1, the first optical path conversion module 310 may be positioned between the third optical module 230 and the inkjet head 600. In an embodiment, the first optical path module 310 may guide the paths of the first laser beams LB1 so that the first laser beams LB1 pass through the lower region adjacent to the inkjet head 600. In addition, the first optical path module 310 may guide the paths of the second laser beams LB2 so that the second laser beams LB2 pass through the lower region adjacent to the inkjet head 600. For example, the first optical path module 310 may include a first mirror 311 and a second mirror 312.

The second optical path conversion module 320 may be positioned between the inkjet head 600 and the optical sensor array 400. In an embodiment, the second optical path module 320 may guide the paths of the first laser beams LB1 so that the first laser beams LB1 are incident to the optical sensor array 400. In addition, the first optical path module 310 may guide the paths of the second laser beams LB2 so that the second laser beams LB2 are incident to the optical sensor array 400. For example, the second optical path module 320 may include a third mirror 321 and a fourth mirror 322.

The substrate SUB may be disposed on a stage STG. A motor 511, a shaft 512, and a mount 513 may be formed on the stage STG. The motor 511 may drive the shaft 512, and the shaft 512 may move the mount 513 in a second direction D2 or a fourth direction D4 opposite to the second direction D2. The mount 513 may be coupled to the second mirror 312 (or the third mirror 321). The motor 511, the shaft 512, and the mount 513 may adjust a height of the second mirror 312 (or the third mirror 321).

Referring to FIGS. 1 and 3, the inkjet head 600 may include a plurality of nozzles. For example, the inkjet head 600 may include a first nozzle 610, a second nozzle 630, a third nozzle 650, and a fourth nozzle 670. In addition, a plurality of spaces may be defined between the nozzles. For example, a first space 620 adjacent to the third nozzle 650 may be defined, and a second space 640 may be defined between the third nozzle 650 and the fourth nozzle 670.

The first laser beams LB1 may pass through the lower regions adjacent to the nozzles to be parallel to the lower surface of the inkjet head 600. In other words, the first laser beams LB1 may pass through the lower regions of the first to fourth nozzles 610, 630, 650, and 670. For example, the first laser beams LB1 may pass through the lower regions adjacent to the nozzles in a first direction D1 opposite to the third direction D3.

As described above, the foreign material may exist in the lower region adjacent to the inkjet head 600. In an embodiment, the foreign material may exist in the second nozzle 630. Accordingly, a third laser beam LB1' passing through the lower region of the second nozzle 630 among the first laser beams LB1 may be defined. In addition, the foreign material may exist in the second space 640. Accordingly, a fourth laser beam LB2' passing through the lower region of the second space 640 among the second laser beams LB2 may be defined.

Meanwhile, the foreign material may mean anything that interfere with the ink ejection of the nozzles. For example, the foreign material may be residual ink, dust, particles, or the like. In addition, the foreign material may be located in a region that interferes with the ink ejection of the nozzles. For example, the foreign material present in the second nozzle 630 may be positioned to protrude from the second nozzle 630 or may be positioned inside the second nozzle 630.

The optical sensor array 400 may include a plurality of optical sensors. For example, the optical sensor array 400 may include a first optical sensor 410, a second optical sensor 430, a third optical sensor 420, and a fourth optical sensor 440. The first to fourth optical sensors 410, 430, 420, and 440 may measure the intensity of laser beams incident to the first to fourth optical sensors 410, 430, 420, and 440, respectively.

In an embodiment, the first and second optical sensors, 410 and 430, may correspond to the first and second nozzles, 610 and 630. In other words, the first and second optical sensors, 410 and 430, may measure a first intensity of the first laser beam LB1 and a third intensity of the third laser beam LB1', respectively. In this case, the third intensity may be smaller than the first intensity because first foreign material FM1 absorbs, reflects, or diffracts at least a portion of the third laser beam LB1'.

In an embodiment, the third and fourth optical sensors, 420 and 440, may correspond to the first and second spaces, 620 and 640. In other words, the third and fourth optical sensors, 420 and 440, may measure the second intensity of the second laser beam LB2 and the fourth intensity of the fourth laser beam LB2'. In this case, the fourth intensity may be smaller than the second intensity because second foreign material FM2 absorbs, reflects, or diffracts at least a portion of the fourth laser beam LB2'.

The controller 700 (FIG. 1) may control the ink ejection of the inkjet head 600 based on the intensities of the first and second laser beams LB1 and LB2.

In an embodiment, the controller 700 may determine the third intensity, which is smaller than a first reference intensity, among the first intensities. In addition, the controller 700 may stop the ink ejection of the second nozzle 630 corresponding to the third laser beam LB1' having the third intensity. For example, the first reference intensity may be set according to process conditions.

In an embodiment, the controller 700 may determine the fourth intensity, which is smaller than a second reference intensity, among the second intensities. In addition, the controller 700 may stop the ink ejection of the third and fourth nozzles 650 and 670 adjacent to the second space 640 corresponding to the fourth laser beam LB2' having the fourth intensity. For example, the second reference intensity may be set according to process conditions.

In addition, the controller 700 may consider the ink ejection of the inkjet head 600. For example, when ink is ejected from the first nozzle 610, the first intensity of the first laser beam LB1 may be temporarily decreased. Accordingly, the first intensity may be temporarily smaller than the first reference intensity. However, the controller 700 may consider the ink ejection of the first nozzle 610 and may determine that the foreign material does not exist in the first nozzle 610.

Figure 4:
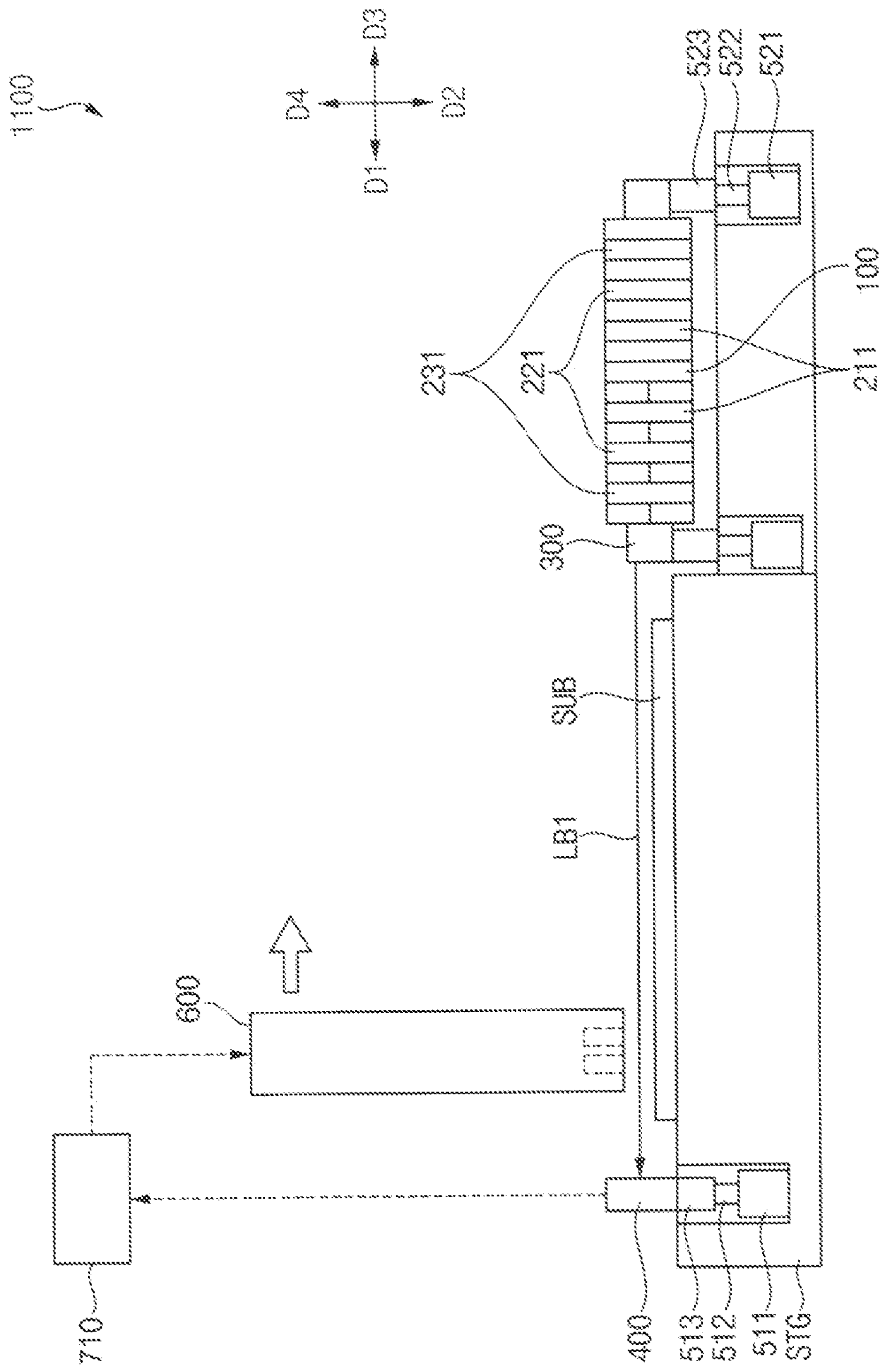
FIG. 4 is a side view illustrating an inspection apparatus according to another embodiment.
Figure 5:
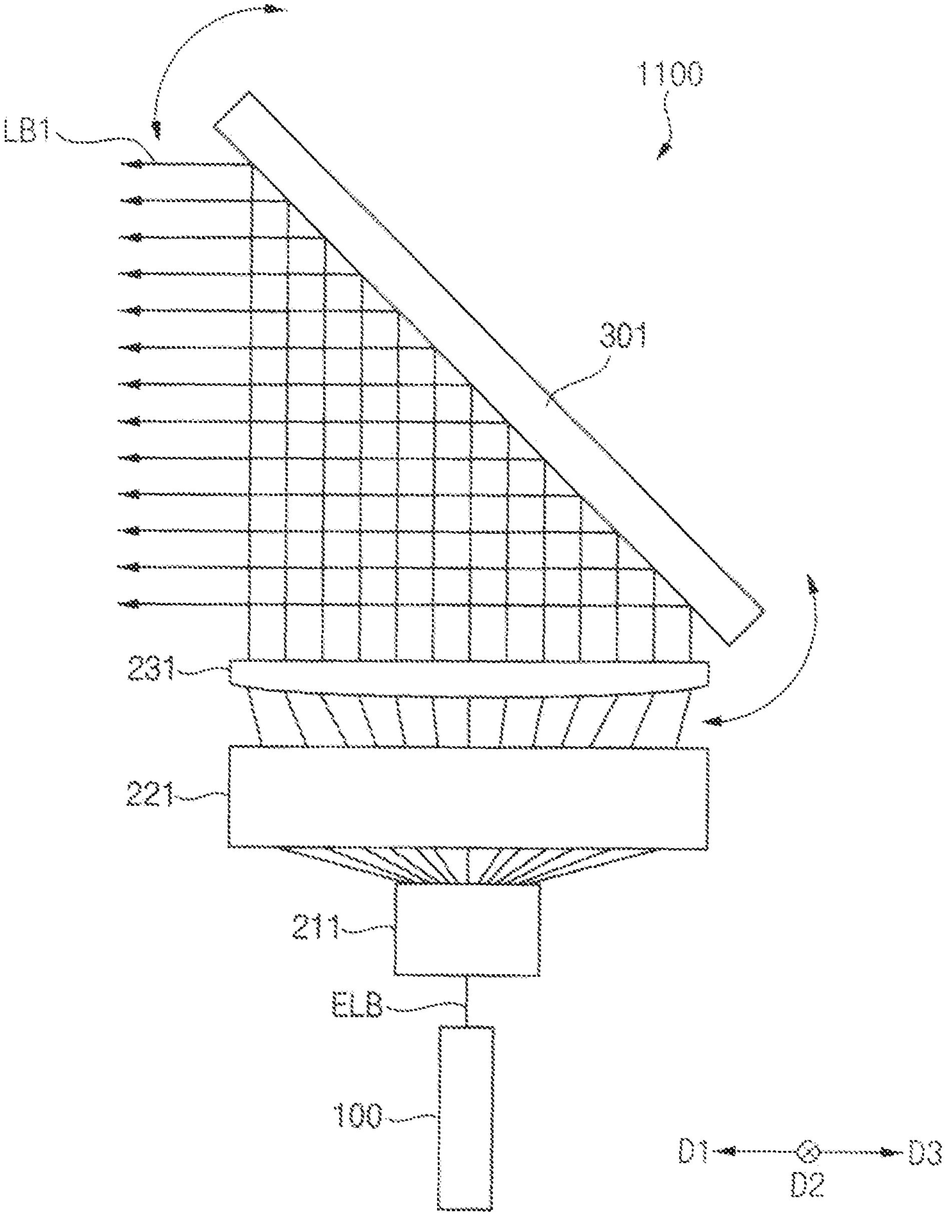
FIG. 5 and FIG. 6 are plan views illustrating a laser, a first optical module, a second optical module, a third optical module, and a mirror included in the inspection apparatus of FIG. 4.
Figure 6:
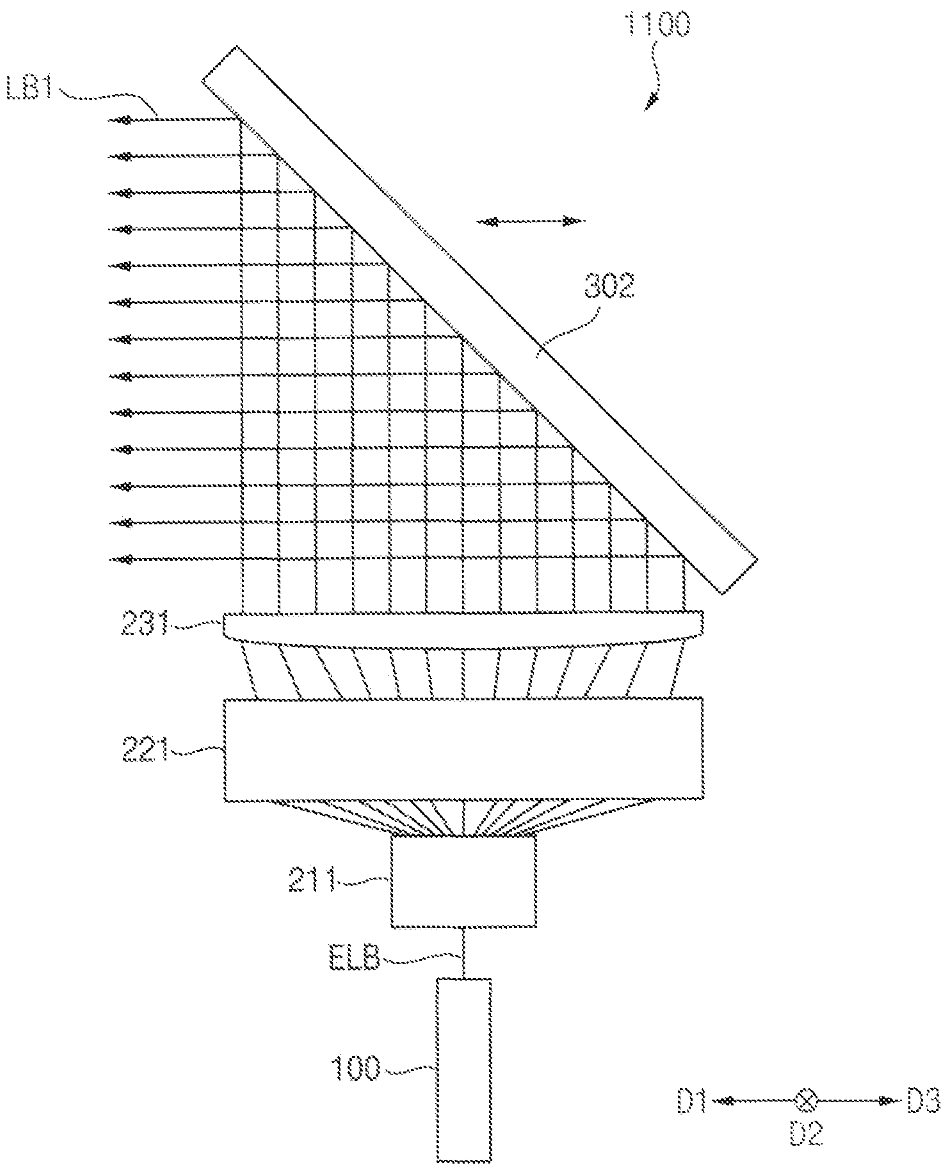
Figure 7:
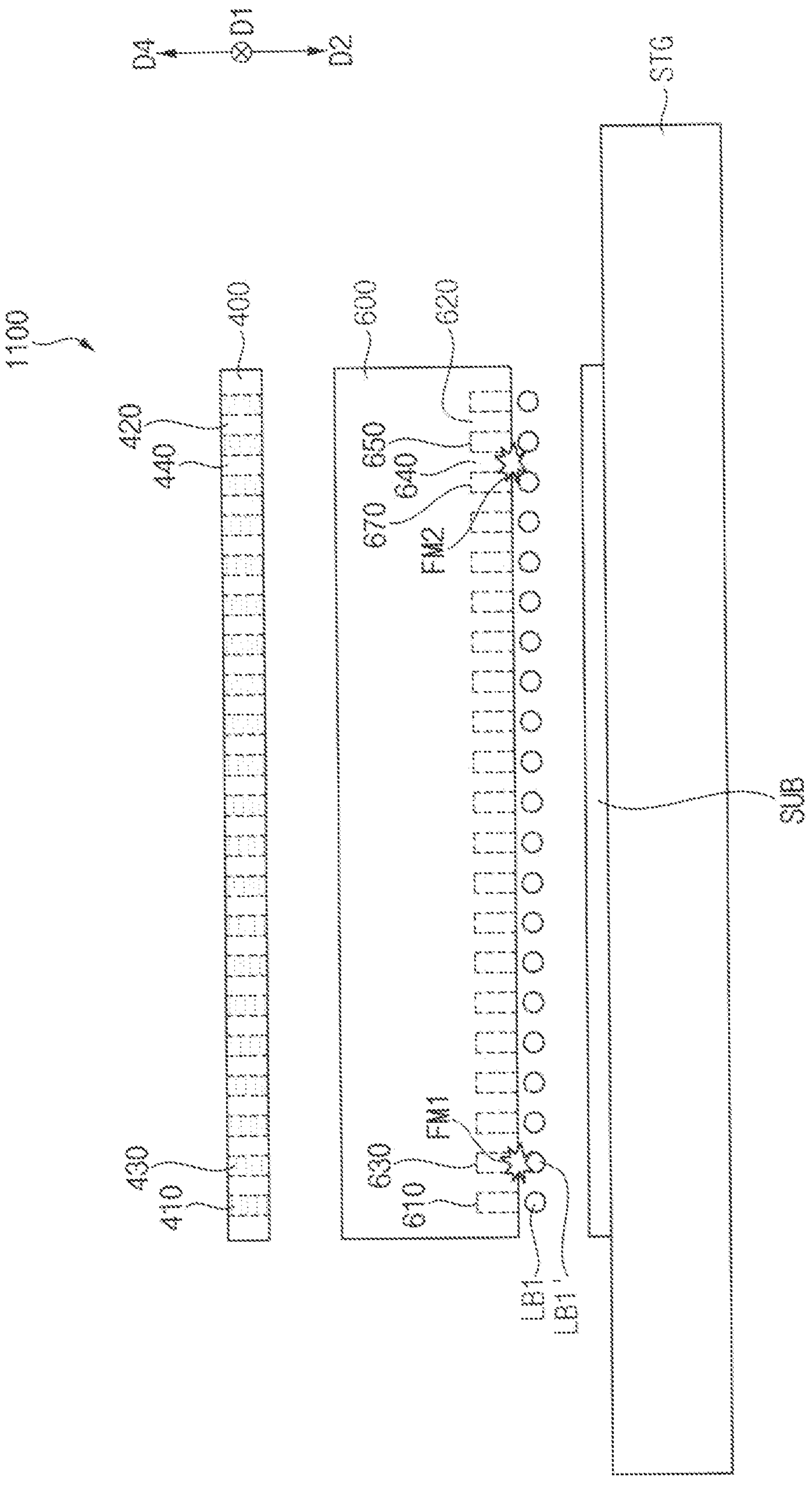
FIG. 7 and FIG. 8 are front views illustrating an optical sensor array included in the inspection apparatus of FIG. 4.
Figure 8:
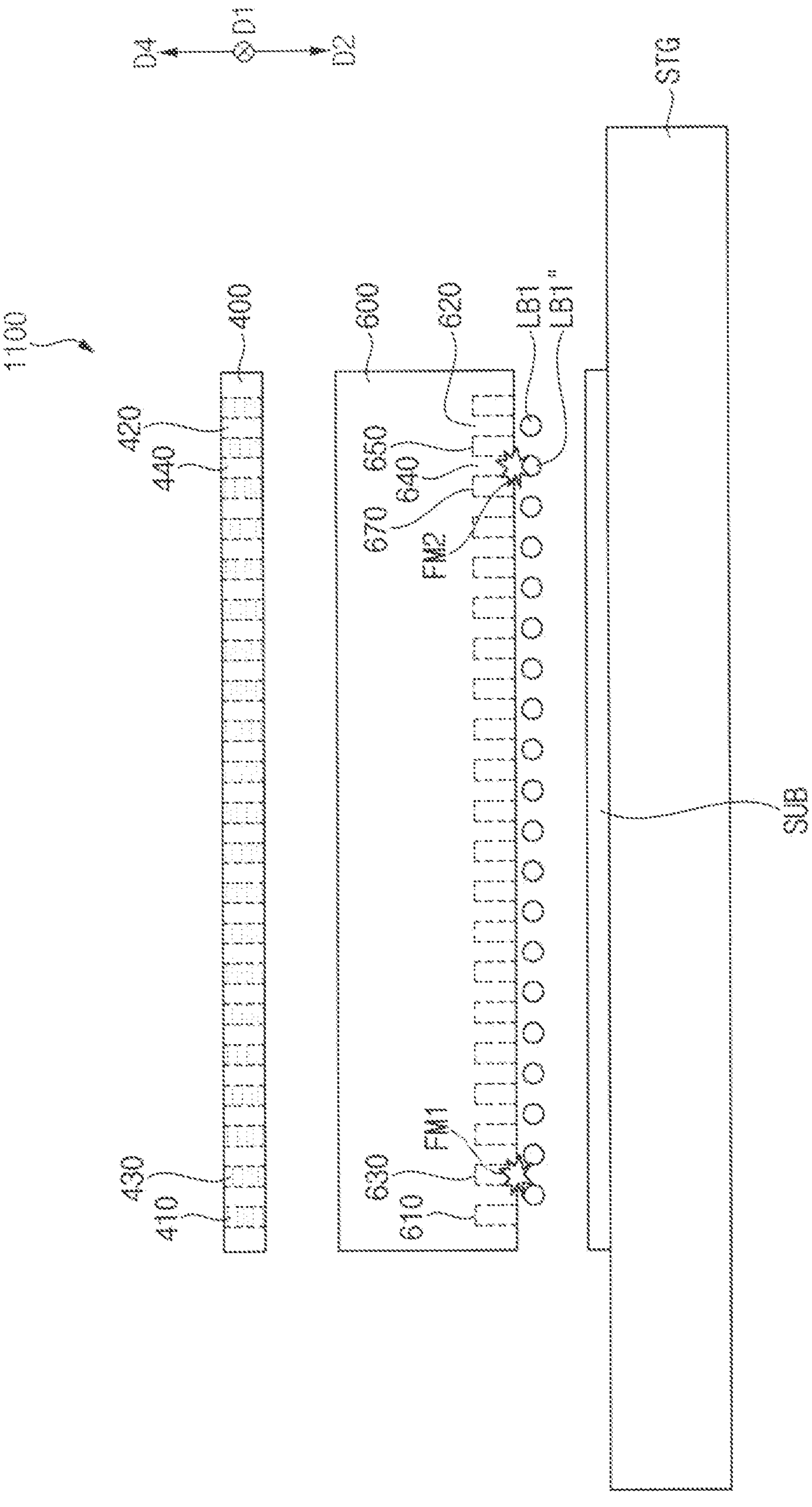

FIG. 4 is a side view illustrating an inspection apparatus according to another embodiment. FIG. 5 and FIG. 6 are plan views illustrating a laser, a first optical module, a second optical module, a third optical module, and a mirror included in the inspection apparatus of FIG. 4. FIG. 7 and FIG. 8 are front views illustrating an optical sensor array included in the inspection apparatus of FIG. 4.

Referring to FIG. 4, the inspection apparatus 1100 according to another embodiment of the present invention may include the laser 100, a first optical module 211, a second optical module 221, and a third optical module 231, a fourth optical module 300, the optical sensor array 400, and a controller 700.

The inkjet head 600 may include the nozzles. When the ink ejection by the inkjet head 600 is performed, the inkjet head 600 may be moved in the third direction D3, and the nozzles may eject ink toward the substrate SUB.

While the ink ejection is being performed, the inspection operation by the inspection apparatus 1100 may be performed. When the inspection operation of the inspection apparatus 1100 is performed, the first laser beams LB1 may pass through the lower region adjacent to the inkjet head 600 to be parallel to the lower surface of the inkjet head 600. When a foreign material exists under the inkjet head 600, intensities of the first laser beams LB1 may be decreased. The inspection apparatus 1100 may inspect the presence or absence of the foreign material in real time based on the intensities.

Referring to FIGS. 4, 5 and 6, the laser 100 may generate at least one output laser beam ELB. The laser 100 may be substantially the same as the laser 100 described with reference to FIG. 2.

The first optical module 211 may be positioned between the laser 100 and the second optical module 221. In an embodiment, the first optical module 211 may divide the output laser beam ELB into the first laser beams LB1. For example, the number of the first laser beams LB1 may be the same as the number of the first laser beams LB1 described with reference to FIG. 2. In addition, the first laser beams LB1 may pass through the first optical module 211 at different angles. For example, the first optical module 211 may be a multi beam generation module.

The second optical module 221 may be positioned between the first optical module 211 and the third optical module 231. In an embodiment, the second optical module 221 may adjust the intervals of the first laser beams LB1. For example, the second optical module 221 may be an optical zoom module including a plurality of lenses.

The third optical module 231 may be positioned between the second optical module 221 and the fourth optical module 300. In an embodiment, the third optical module 231 may guide paths of the first laser beams LB1 so that the first laser beams LB1 are parallel to each other. For example, the third optical module 231 may be an f-theta lens.

The fourth optical module 300 may be positioned between the third optical module 231 and the inkjet head 600. In an embodiment, the fourth optical module 300 may guide the first laser beams LB1 to a first scan path or a second scan path.

In an embodiment, as shown in FIG. 5, the fourth optical module 301 may rotate. When the fourth optical module 301 has a first angle, the first laser beams LB1 may be guided to the first scan path. In addition, when the fourth optical module 301 has a second angle different from the first angle, the first laser beams LB1 may be guided to the second scan path.

In another embodiment, as shown in FIG. 6, the fourth optical module 302 may move in parallel. For example, the fourth optical module 302 may move in parallel in the first direction D1 and the third direction D3. When the fourth optical module 302 has a first position, the first laser beams LB1 may be guided to the first scan path. In addition, when the fourth optical module 302 has a second position different from the first position, the first laser beams LB1 may be guided to the second scan path. In addition, the fourth optical module 302 may move in parallel in the vertical direction on the same plane.

Referring back to FIG. 4, the substrate SUB may be disposed on the stage STG. The motor 511, the shaft 512, and the mount 513 may be formed on the stage STG. The stage STG, the motor 511, the shaft 512, and the mount 513 may be substantially the same as the stage STG, the motor 511, the shaft 512, and the mount 513 described with reference to FIG. 1.

Referring to FIGS. 4, 7, and 8, the first laser beams LB1 may pass through the lower region adjacent to the inkjet head 600 to be parallel to the lower surface of the inkjet head 600. In addition, the first laser beams LB1 may pass through lower regions adjacent to the nozzles or lower regions of the spaces in a scan method.

In detail, as shown in FIG. 7, the first laser beams LB1 guided through the first scan path may pass through the lower regions adjacent to the nozzles. For example, the first laser beams LB1 may pass through the lower regions adjacent to the first to fourth nozzles 610, 630, 650, and 670.

In addition, as shown in FIG. 8, the first laser beams LB1 guided through the second scan path may pass through the lower regions of the spaces. For example, the first laser beams LB1 may pass through the lower regions adjacent to the first and second spaces 620 and 640.

The optical sensor array 400 may include a plurality of optical sensors. For example, the optical sensor array 400 may include the first optical sensor 410, the second optical sensor 430, the third optical sensor 420, and the fourth optical sensor 440.

In an embodiment, the first and second optical sensors 410 and 430 may correspond to the first and second nozzles 610 and 630, respectively. In other words, the first and second optical sensors 410 and 430 may measure a first intensity of the first laser beam LB1 guided in the first scan path and a third intensity of the third laser beam LB1' guided in the first scan path, respectively. In this case, the third intensity may be smaller than the first intensity because the first foreign material FM1 absorbs, reflects, or diffracts at least a portion of the third laser beam LB1'.

In an embodiment, the third and fourth optical sensors 420 and 440 may correspond to the first and second spaces 620 and 640, respectively. In other words, the third and fourth optical sensors 420 and 440 may measure a second intensity of the first laser beam LB1 guided in the second scan path and a fourth intensity of the fourth laser beam LB1" guided in the second scan path. In this case, the fourth intensity may be smaller than the second intensity because the second foreign material FM2 absorbs, reflects, or diffracts at least a portion of the fourth laser beam LB2'.

The controller 710 may control the ink ejection of the inkjet head 600 based on the intensities of the first laser beams LB1.

In an embodiment, the controller 710 may determine the third intensity, which is smaller than a first reference intensity, among the first intensities. In addition, the controller 710 may stop the ink ejection of the second nozzle 630 corresponding to the third laser beam LB1' having the third intensity. For example, the first reference intensity may be set according to process conditions.

In an embodiment, the controller 710 may determine the fourth intensity, which is smaller than a second reference intensity, among the second intensities. In addition, the controller 710 may stop the ink ejection of the third and fourth nozzles 650 and 670 adjacent to the second space 640 corresponding to the fourth laser beam LB1" having the fourth intensity. For example, the second reference intensity may be set according to process conditions.

Figure 9:
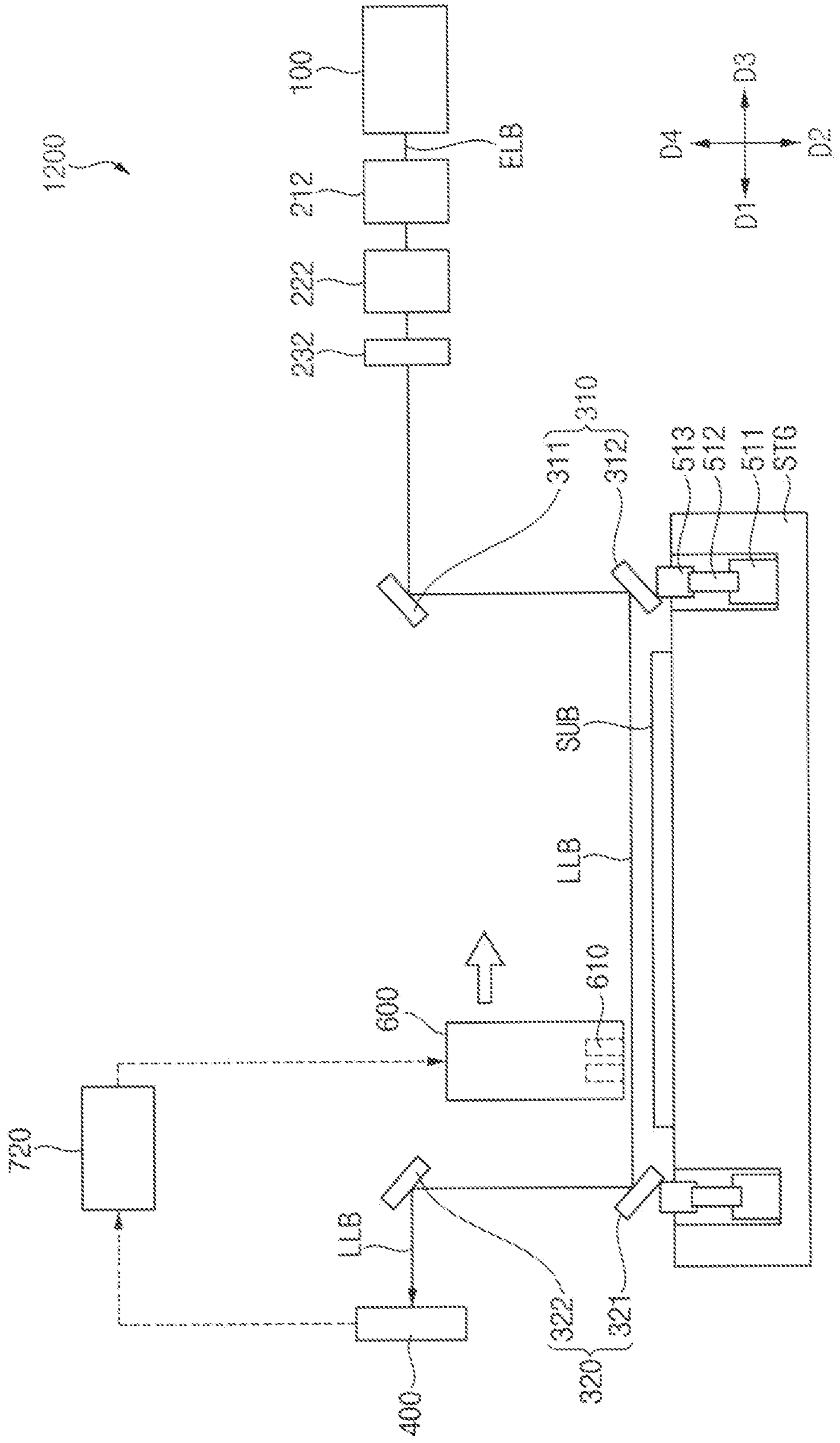
FIG. 9 is a side view illustrating an inspection apparatus according to still another embodiment.
Figure 10:
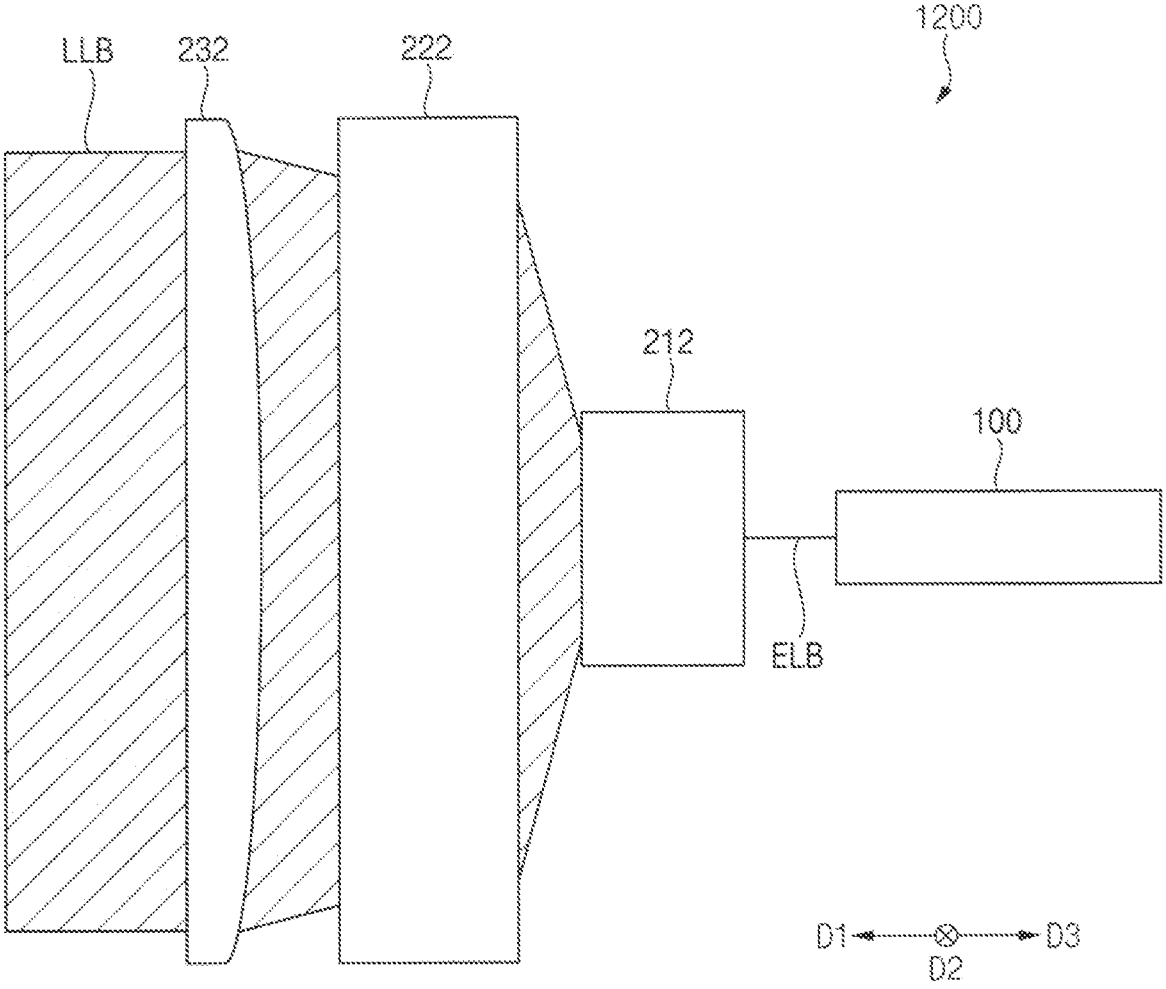
FIG. 10 is a plan view illustrating a laser, a first optical module, a second optical module, and a third optical module included in the inspection apparatus of FIG. 9.
Figure 11:
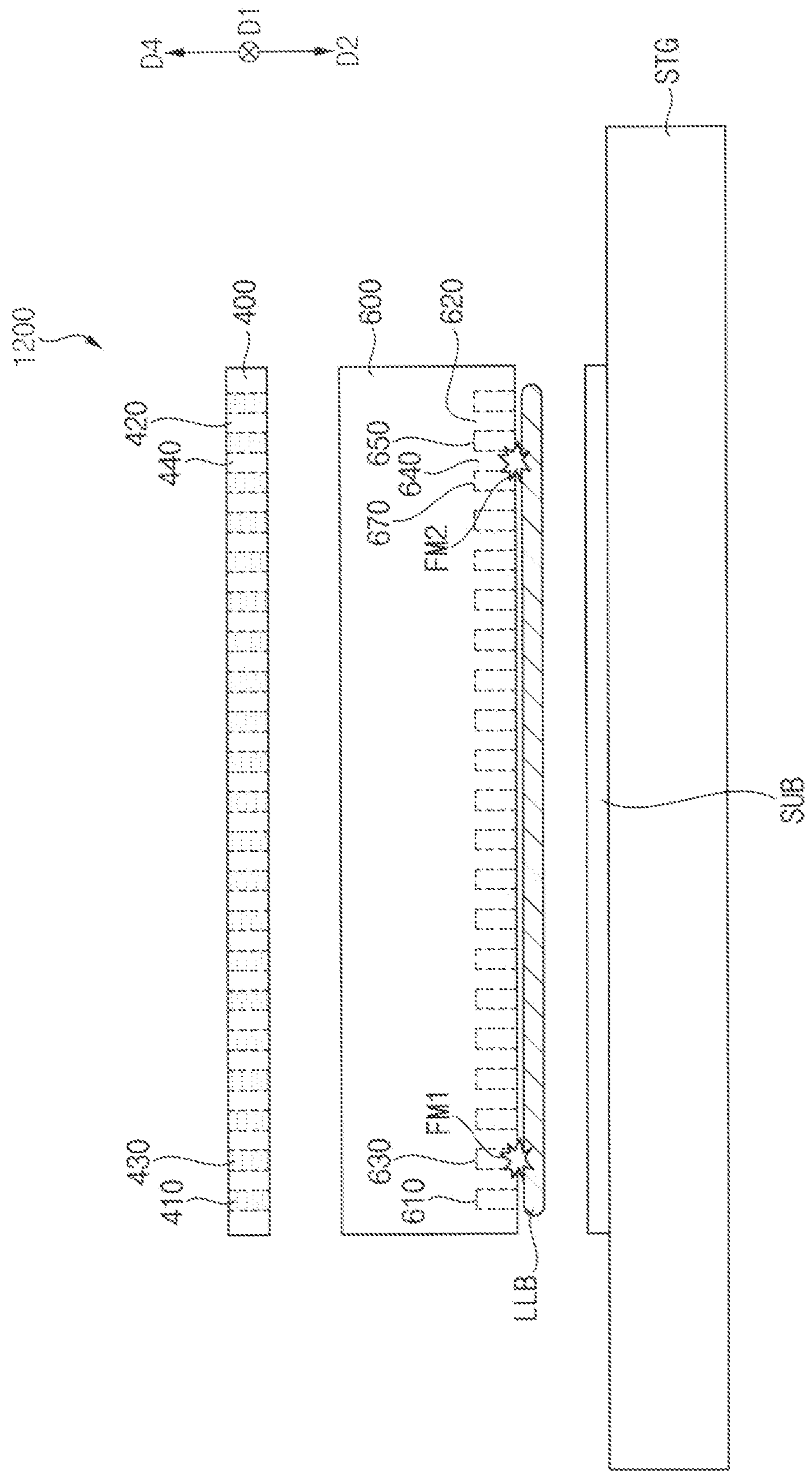
FIG. 11 is a front view illustrating an optical sensor array included in the inspection apparatus of FIG. 9.

FIG. 9 is a side view illustrating an inspection apparatus according to still another embodiment. FIG. 10 is a plan view illustrating a laser, a first optical module, a second optical module, and a third optical module included in the inspection apparatus of FIG. 9. FIG. 11 is a front view illustrating an optical sensor array included in the inspection apparatus of FIG. 9.

Referring to FIG. 9, the inspection apparatus 1200 according to still another embodiment of the present invention may include the laser 100, a first optical module 212, a second optical module 222, a third optical module 232, the first optical path conversion module 310, the second optical path conversion module 320, the optical sensor array 400, and the controller 720.

The inkjet head 600 may include the nozzles. When the ink ejection of the inkjet head 600 is performed, the inkjet head 600 may be moved in the third direction D3, and the nozzles may respectively eject ink toward the substrate SUB.

While the ink ejection is being performed, the inspection operation of the inspection apparatus 1200 may be performed. When the inspection operation of the inspection apparatus 1200 is performed, a line laser beam LLB may pass through the lower region adjacent to the inkjet head 600 to be parallel to the lower surface of the inkjet head 600. When a foreign material exists under the inkjet head 600, the intensity of the line laser beam LLB may be partially decreased. The inspection apparatus 1200 may inspect the presence or absence of the foreign material in real time based on the intensity.

Referring to FIG. 10, the laser 100 may generate at least one output laser beam ELB. The laser 100 may be substantially the same as the laser 100 described with reference to FIG. 2.

The first optical module 212 may be positioned between the laser 100 and the second optical module 222. In an embodiment, the first optical module 212 may divide the output laser beam ELB into the single line laser beam LLB. For example, the number of the first laser beams LB1 may be the same as the number of the first laser beams LB1 described with reference to FIG. 2. In addition, the first laser beams LB1 may pass through the first optical module 211 at different angles. For example, the first optical module 212 may be a line beam generator.

The second optical module 222 may be positioned between the first optical module 212 and the third optical module 232. In an embodiment, the second optical module 222 may adjust a width of the line laser beam LLB. For example, the second optical module 222 may be an optical zoom module including a plurality of lenses.

The third optical module 232 may be positioned between the second optical module 222 and the inkjet head 600. In an embodiment, the third optical module 232 may guide a path of the line laser beam LLB. For example, the third optical module 232 may be an f-theta lens.

Referring back to FIG. 9, the first optical path conversion module 310 and the second optical path conversion module 320 may be substantially the same as the first optical path conversion module 310 and the second optical path conversion module 320 described with reference to FIG. 1. In addition, the stage STG, the motor 511, the shaft 512, and the mount 513 may be substantially the same as the stage STG, the motor 511, the shaft 512, and the mount 513.

Referring to FIGS. 9 and 11, the line laser beam LLB may pass through the lower region adjacent to the inkjet head 600 to be parallel to the lower surface of the inkjet head 600. In an embodiment, the line laser beam LLB may pass through lower regions adjacent to the nozzles and lower regions of the spaces.

The optical sensor array 400 may include a plurality of optical sensors. For example, the optical sensor array 400 may include the first optical sensor 410, the second optical sensor 430, the third optical sensor 420, and the fourth optical sensor 440.

In an embodiment, the first and second optical sensors 410 and 430 may correspond to the first and second nozzles 610 and 630, respectively. In other words, the first and second optical sensors 410 and 430 may measure the first intensities of the line laser beam LLB overlapping the lower regions of the first and second nozzles 610 and 630, respectively.

In an embodiment, the third and fourth optical sensors 420 and 440 may correspond to the first and second spaces 620 and 640, respectively. In other words, the third and fourth optical sensors 420 and 440 may measure the second intensities of the line laser beam LLB overlapping the lower regions of the first and second spaces 620 and 640, respectively.

The controller 720 may control the ink ejection of the inkjet head 600 based on the intensity of the line laser beam LLB.

In an embodiment, the controller 720 may determine the third intensity, which is smaller than a first reference intensity, among the first intensities. In addition, the controller 720 may stop the ink ejection of the second nozzle 630 overlapping the line laser beam LLB having the third intensity. For example, the first reference intensity may be set according to process conditions.

In an embodiment, the controller 720 may determine the fourth intensity, which is smaller than a second reference intensity, among the second intensities. In addition, the controller 720 may stop the ink ejection of the third and fourth nozzles 650 and 670 adjacent to the second space 640 overlapping the line laser beam LLB having the fourth intensity. For example, the second reference intensity may be set according to process conditions.

The inspection apparatuses 1000, 1100, and 1200 according to embodiments of the present invention may perform an inspection operation while the inkjet head 600 performs the ink ejection. The inspection operation may be performed based on the intensity of the laser beam passing through the lower region adjacent to the inkjet head 600 to be parallel to the lower surface of the inkjet head 600. Based on the intensity of the laser beam, the inspection apparatuses 1000, 1100, and 1200 may inspect in real time whether or not a foreign material is present on the lower surface of the inkjet head 600 and a position of the foreign material.

Figure 12:
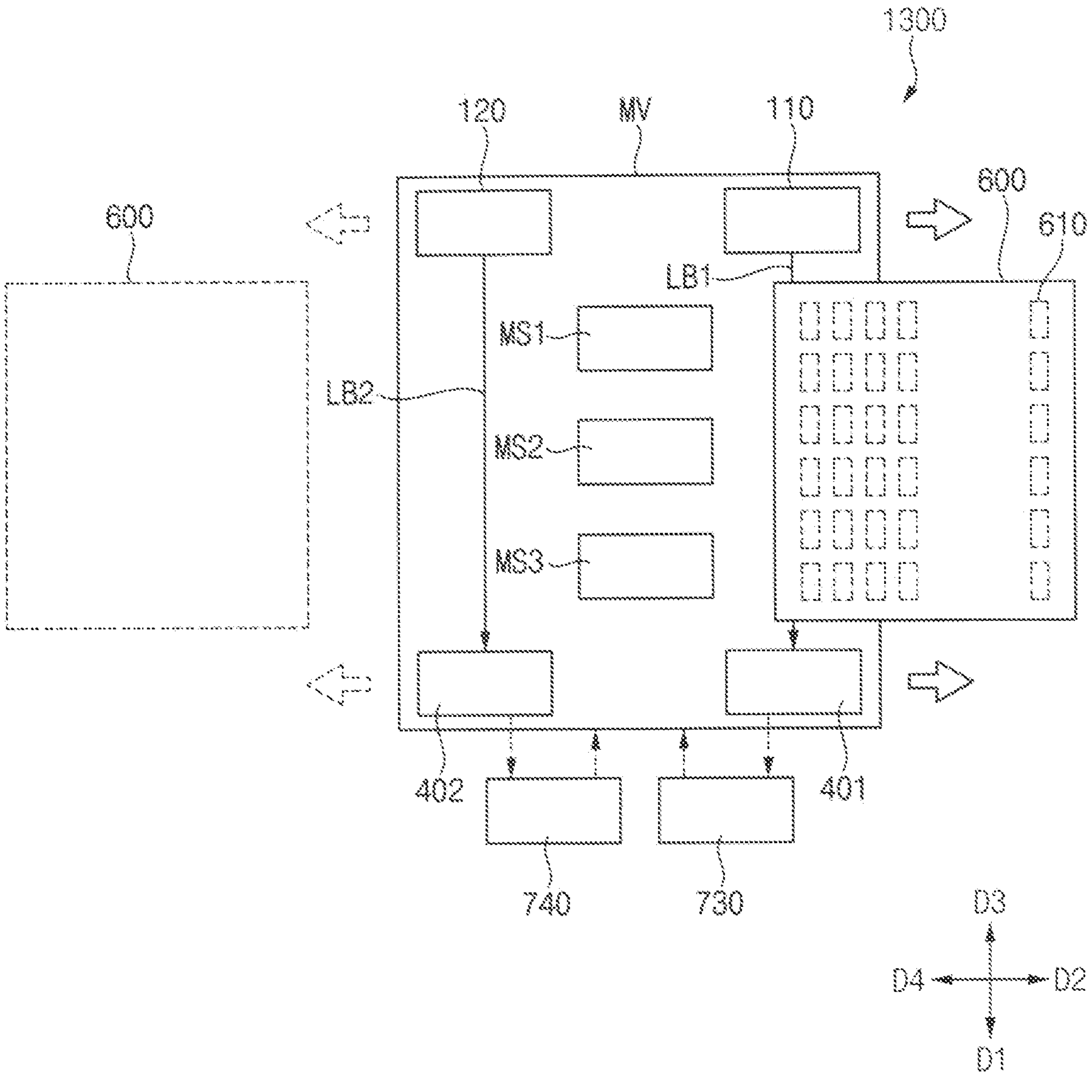
FIG. 12 is a plan view illustrating an inspection apparatus according to still another embodiment.
Figure 13:
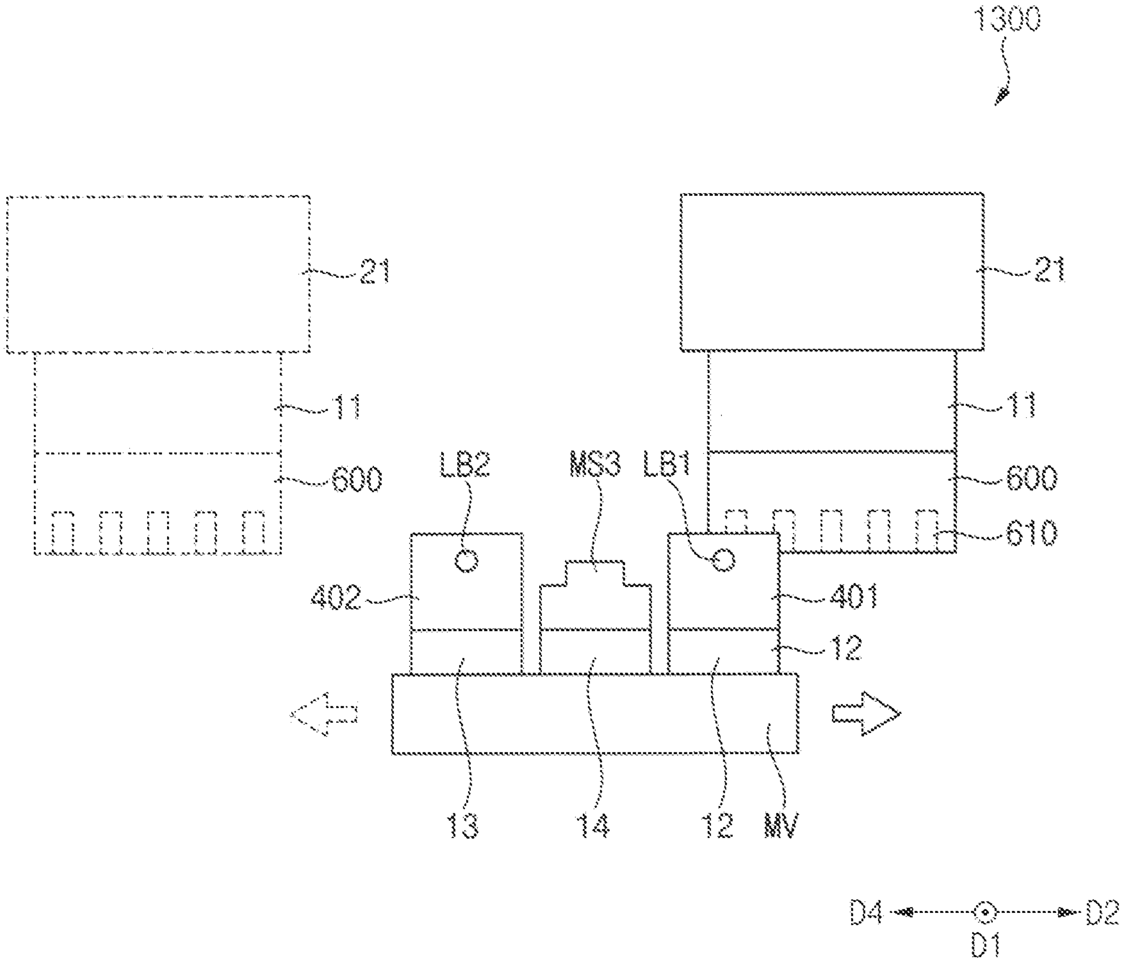
FIG. 13 is a side view illustrating the inspection apparatus of FIG. 12.

FIG. 12 is a plan view illustrating an inspection apparatus according to still another embodiment. FIG. 13 is a side view illustrating the inspection apparatus of FIG. 12.

Referring to FIGS. 12 and 13, the inspection apparatus 1300 according to still another embodiment of the present invention may include a first laser 110, a first optical sensor 401, a first controller 730, a second laser. 120, a second optical sensor 402, and a second controller 740.

Before the inkjet head 600 performs the above-described ink ejection (or after the inkjet head 600 performs the ink ejection, at least one measuring device may perform a measurement operation. For example, the measurement operation may mean an operation in which the measuring device measures a condition of the inkjet head 600. The measuring device may include a first measuring device MS1, a second measuring device MS2, and a third measuring device MS3.

In an embodiment, the first to third measuring devices MS1, MS2, and MS3 may measure a position of an alignment mark formed on the lower surface of the inkjet head 600. In another embodiment, the first to third measuring devices MS1, MS2, and MS3 may measure a liquid level of ink located inside each of the nozzles 610 included in the inkjet head 600.

While the first to third measuring devices MS1, MS2, and MS3 perform the measurement operation, the first to third measuring devices MS1, MS2, and MS3 may overlap the inkjet head 600. For example, the first to third measuring devices MS1, MS2, and MS3 may be moved in a second direction D2. As the first to third measuring devices MS1, MS2, and MS3 pass through the lower region adjacent to the inkjet head 600, when a foreign material exists under the inkjet head 600, the first to third measuring devices MS1, MS2, MS3 may be damaged. For example, the foreign material may penetrate into the first to third measuring devices MS1, MS2, and MS3, or collide with the first to third measuring devices MS1, MS2, and MS3.

Before the measurement operation is performed, the inspection operation of the inspection apparatus 1300 may be performed. When the inspection operation of the inspection apparatus 1300 is performed, a first laser beam LB1 may pass through the lower region adjacent to the inkjet head 600 to be parallel to the lower surface of the inkjet head 600. When a foreign material exists under the inkjet head 600, the intensity of the first laser beam LB1 may be decreased. The inspection device 1300 may inspect the presence or absence of the foreign material in real time based on the intensity.

The first laser 110 may generate at least one first laser beam LB1. For example, the first laser 110 may be a solid-state laser (e.g., a ruby laser, a glass laser, a YAG laser (yttrium aluminum gamet laser), a YLF laser (yttrium lithium fluoride laser), etc.), a gas laser (e.g., an excimer laser, a helium-neon laser, etc.), a pulsed laser, or the like.

In an embodiment, the first laser 110 may generate a single first laser beam LB1. In another embodiment, the first laser 110 may generate a plurality of first laser beams. Hereinafter, the first laser 110 for generating the single first laser beam LB1 will be described, but the present invention is not limited thereto.

The first optical sensor 401 may measure the intensity of the first laser beam LB1 passing through the lower region adjacent to the inkjet head 600. In an embodiment, the first optical sensor 401 may be a single optical sensor. In another embodiment, the first optical sensor 401 may be an optical sensor array including a plurality of optical sensors. For example, the number of optical sensors included in the first optical sensor 401 may be the same as the number of the first laser beams LB1. Hereinafter, the first optical sensor 401 will be described as a single optical sensor, but the present invention is not limited thereto.

The first controller 730 may control the measurement operation of the first to third measuring devices MS1, MS2, and MS3 based on the intensity of the first laser beam LB1.

In an embodiment, when the intensity of the first laser beam LB1 is smaller than a reference intensity, the first controller 730 may stop the measurement operation of the first to third measuring devices MS1, MS2, and MS3. For example, when the intensity of the first laser beam LB1 is smaller than the reference intensity, the first to third measuring devices MS1, MS2, and MS3 may not pass through the lower region adjacent to the inkjet head 600.

For example, the inkjet head 600 may be connected to a gantry 21 by a first connecting member 11, and the gantry 21 may support the inkjet head 600. The first laser 110, the first optical member 401, the first measuring device MS1, the second measuring device MS2, and the third measuring device MS3 may be disposed on a moving member MV. For example, the first laser 110 and the first optical member 401 may be disposed on the moving member MV by a second connection member 12, and the first to third measuring devices MS1, MS2, and MS3 may be disposed on the moving member MV by the fourth connecting member 14. As the moving member MV moves in the second direction D2, the first laser 110, the first optical member 401, the first measuring device MS1, the second measuring device MS2, and the third measuring device MS3 may be moved in the second direction D2.

The second laser 120 may generate at least one second laser beam LB2. In an embodiment, the second laser 120 may face the first laser 110 based on the first to third measuring devices MS1, MS2, and MS3.

The second optical sensor 402 may measure the intensity of the second laser beam LB2. In an embodiment, the second laser 120 and the second optical sensor 402 may be disposed on the moving member MV by a third connection member 13. The second optical sensor 402 may face the first optical sensor 110 based on the first to third measuring devices MS1, MS2, and MS3.

The second controller 740 may control the measurement operation of the first to third measuring devices MS1, MS2, and MS3 based on the intensity of the second laser beam LB2.

In an embodiment, the second laser 120, the second optical sensor 402, and the second controller 730 may have optional compositions. For example, when the moving member MV is moved in a fourth direction D4 opposite to the second direction D2, and the inkjet head 600 is disposed in the fourth direction D4 from the first to third measuring devices MS1, MS2, and MS3, the inspection apparatus 1300 may include the second laser 120, the second optical sensor 402, and the second controller 730. In addition, the number of lasers, optical sensors, and controllers included in the inspection apparatus 1300 may be set as necessary.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An inspection apparatus comprising:
a laser;
an optical sensor;
an inkjet head including nozzles; and
a controller,
such that in operation the laser outputs at least one laser beam in a first direction, the optical sensor measures an intensity of the at least one laser beam passing through a lower region adjacent to the inkjet head, and the controller controls an ink ejection from the inkjet head based on the intensity of the at least one laser beam,
wherein the at least one laser beam is directed parallel to a direction of travel of the inkjet head,
wherein the laser beam is directed between the inkjet head and a substrate that receives the ink ejection, and
wherein the nozzles of the inkjet head are arranged in a direction perpendicular to the direction of travel of the inkjet head.

2. The inspection apparatus of claim 1, wherein when a foreign material exists in the lower region adjacent to the inkjet head the foreign material reflects or absorbs at least a portion of the laser beam, and the optical sensor detects a decrease of the intensity of the laser beam.

3. The inspection apparatus of claim 1, wherein the output laser beam is converted into a single line laser beam passing through the lower regions adjacent to the nozzles.

4. The inspection apparatus of claim 3, wherein the optical sensor measures first intensities of the line laser beam, and
wherein the controller determines a second intensity smaller than a reference intensity among the first intensities, and stops the ink ejection of the nozzle overlapping to the line laser beam having the second intensity.

5. The inspection apparatus of claim 1, wherein the at least one laser beam is divided into:
first laser beams that pass through lower regions that are adjacent to the nozzles and between the inkjet head and the substrate; and
second laser beams passing through lower regions that are adjacent to spaces between the nozzles and between the inkjet head and the substrate.

6. The inspection apparatus of claim 5, further comprising:
a first optical module positioned between the laser and the inkjet head, wherein the first optical module divides the output laser beam into the first laser beams and the second laser beams;
a second optical module positioned between the first optical module and the inkjet head wherein the second optical module adjusts intervals between the first laser beams and the second laser beams; and
a third optical module positioned between the second optical module and the inkjet head wherein the third optical module guides paths of the first laser beams so that the first laser beams are parallel to each other, and guides paths of the second laser beams so that the second laser beams are parallel to each other.

7. The inspection apparatus of claim 6, wherein the first laser beams pass through the lower regions adjacent to the nozzles to be parallel to a lower surface of the inkjet head, and
wherein the second laser beams pass through the lower regions adjacent to the spaces to be parallel to the lower surface of the inkjet head.

8. The inspection apparatus of claim 5, further comprises:
a first optical path conversion module positioned between the laser and the inkjet head wherein the first optical path conversion module guides paths of the first laser beams so that the first laser beams pass through the lower region adjacent to the inkjet head; and
a second optical path conversion module positioned between the inkjet head and the optical sensor, wherein the second optical path conversion module guides paths of the first laser beams so that the first laser beams are incident to the optical sensor.

9. The inspection apparatus of claim 8, wherein each of the first optical path conversion module and the second optical path conversion module comprise at least one minor.

10. The inspection apparatus of claim 5, wherein the optical sensor measures first intensities of the first laser beams, and
wherein the controller determines a third intensity smaller than a first reference intensity among the first intensities and stops the ink ejection of the nozzle corresponding to a third laser beam having the third intensity.

11. The inspection apparatus of claim 5, wherein the optical sensor measures second intensities of the second laser beams, and
wherein the controller determines a fourth intensity smaller than a second reference intensity among the second intensities, and stops the ink ejection of nozzles adjacent to the spaces corresponding to a fourth laser beam having the fourth intensity.

12. The inspection apparatus of claim 1, wherein the output laser beam is divided into first laser beams having a constant distance from each other, and
wherein the laser beam comprises the first laser beams.

13. The inspection apparatus of claim 12, further comprises:
a first optical module positioned between the laser and the inkjet head, wherein the first optical module divides the output laser beam into the first laser beams;
a second optical module positioned between the first optical module and the inkjet head, wherein the second optical module adjusts intervals between the first laser beams;
a third optical module positioned between the second optical module and the inkjet head, the third optical module guides paths of the first laser beams so that the first laser beams are parallel to each other; and
a fourth optical module positioned between the third optical module and the inkjet head, wherein the fourth optical module guides the first laser beams to a first scan path or a second scan path.

14. The inspection apparatus of claim 13, wherein the first laser beams guided in the first scan path pass through lower regions adjacent to the nozzles to be parallel to a lower surface of the inkjet head.

15. The inspection apparatus of claim 13, wherein the second laser beams guided in the second scan path pass through lower regions of spaces defined between the nozzles to be parallel to a lower surface of the inkjet head.

16. The inspection apparatus of claim 13, wherein the optical sensor measures first intensities of the first laser beams guided in the first scan path, and
wherein the controller determines a third intensity smaller than a first reference intensity among the first intensities and stops the ink ejection of the nozzle corresponding to a third laser beam having the third intensity.

17. The inspection apparatus of claim 13, wherein the optical sensor measures second intensities of the first laser beams guided in the second scan path, and wherein the controller determines a fourth intensity smaller than a second reference intensity among the second intensities and stops the ink ejection of nozzles adjacent to the spaces corresponding to a fourth laser beam having the fourth intensity.

* * * * *